Oct. 20, 1959    J. N. PORTERFIELD    2,909,268
CAN HANDLING MACHINE DRIVE AND LOADING MECHANISM
Filed April 23, 1958    4 Sheets-Sheet 1

INVENTOR.
JACK N. PORTERFIELD
BY Bertha L. MacGregor
ATTORNEY

Oct. 20, 1959　　　J. N. PORTERFIELD　　　2,909,268
CAN HANDLING MACHINE DRIVE AND LOADING MECHANISM
Filed April 23, 1958　　　　　　　　　　　　4 Sheets-Sheet 2

INVENTOR.
JACK N. PORTERFIELD
BY Bertha L. M<sup>ac</sup>Gregor
ATTORNEY

Oct. 20, 1959   J. N. PORTERFIELD   2,909,268
CAN HANDLING MACHINE DRIVE AND LOADING MECHANISM
Filed April 23, 1958   4 Sheets-Sheet 3

INVENTOR.
JACK N. PORTERFIELD
BY Bertha L. MacGregor
ATTORNEY

Oct. 20, 1959   J. N. PORTERFIELD   2,909,268
CAN HANDLING MACHINE DRIVE AND LOADING MECHANISM
Filed April 23, 1958   4 Sheets-Sheet 4

INVENTOR.
JACK N. PORTERFIELD
BY Bertha L. MacGregor
ATTORNEY

United States Patent Office 2,909,268
Patented Oct. 20, 1959

2,909,268

CAN HANDLING MACHINE DRIVE AND LOADING MECHANISM

Jack N. Porterfield, Denver, Colo., assignor to Aluminum International, Inc., Denver, Colo., a corporation of Colorado Application April 23, 1958, Serial No. 730,497

8 Claims. (Cl. 198—31)

This invention relates to driving and loading mechanism for can handling machines. The particular embodiment shown and described herein is a can washing machine drive and loading mechanism.

The object of the invention is to provide mechanism whereby cans are delivered from a production line chute or conveyor to loading mechanism which deposits the cans in batches of two or more on an endless conveyor in inverted substantially vertical positions. The conveyor travels continuously through a machine, such as a can washing machine, where the cans are subjected to a washing operation.

Cans usually leave a production line by means of a chute where they travel in a single row toward the washing machine loading mechanism. For economical and efficient operation of the washing machine, the cans are deposited in batches on the endless conveyor which is provided with a plurality of longitudinally extending rows of can engaging devices, preferably in the form of loops, which rise from the carrying surface of the conveyor. The rows of can engaging devices are spaced apart transversely of the conveyor, and the loops of each row are also spaced apart so that each loop enters a can and retains it in substantially vertical, inverted position, with the open end of the can down, and for this purpose the fingers or loops on the conveyor are perpendicular to the carrying surface of the conveyor and arranged to enter the open ends of the cans placed thereon by the loading mechanism.

The loading mechanism and conveyor operations are correlated so that the cans are deposited in batches of four or more on the continuously moving conveyor, and in such manner that the conveyor is completely loaded for economical washing of the cans.

For economical handling of cans for any purpose, it is essential that the receiving conveyor be fully loaded, and for efficient handling of cans in a can washing machine, it is also essential that the loading mechanism which transfers cans from a production line chute or conveyor to the washing machine receiving conveyor be located entirely within the washing machine so that acid containing liquid used for washing the cans will be confined within the washing chamber and will not be carried by moving parts of the mechanism anywhere outside of the chamber. The loading mechanism herein shown and described, comprising a star wheel rotated about a vertical axis and a slide plate partially underlying the wheel, fulfills all the aforementioned requirements due to the fact that the loading mechanism does not extend laterally beyond the side edges of the receiving conveyor or outside of the washing chamber and is capable of depositing cans on the entire surface of the receiving conveyor, in rows or areas extending transversely of the receiving conveyor which are fully as wide as the width of the loading mechanism. Thus no space between the chamber side walls and the receiving conveyor side edges is required for housing any loading mechanism parts.

Other objects and advantages of the invention will be apparent from the drawings and following specification.

In the preferred embodiment of my invention shown in the drawings.

Figure 1:
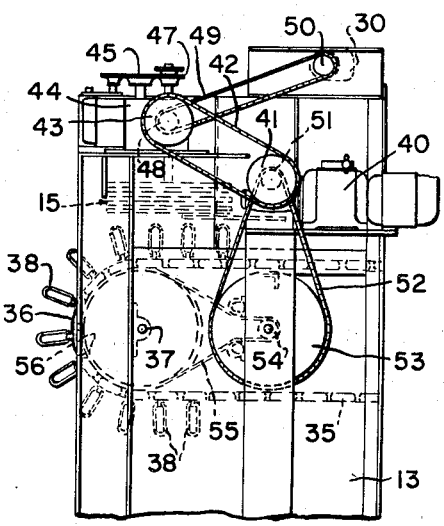
Fig. 1 is a side elevation of the loading end of a can washing machine embodying my invention.

In the drawings, the vertical spaced apart side walls of the washing machines are indicated at 10 and 11, transverse frame members at 12, and a vertical drive mechanism supporting frame at 13. Only the forward end of the machine, in which the can loading mechanism is located, is shown herein.

Figures 3, 4:
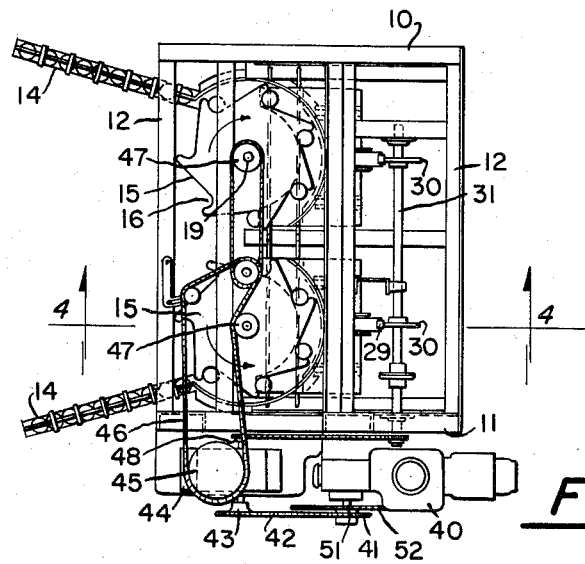
Fig. 4 is a vertical sectional view taken in the plane of the line 4—4 of Fig. 3.

In Figs. 3 and 4 are shown two downwardly inclined chutes 14, on which cans travel in a single row from a production line to the loading mechanism about to be described. The chutes 14 are alike, each leading to a rotatable star wheel indicated as a whole at 15. In the can washing machine shown, two star wheels 15 are used, but one or any desired number may be employed, depending on the width of the washing machine and of the endless conveyor mounted therein for carrying the cans through the washing operation.

Figure 8:
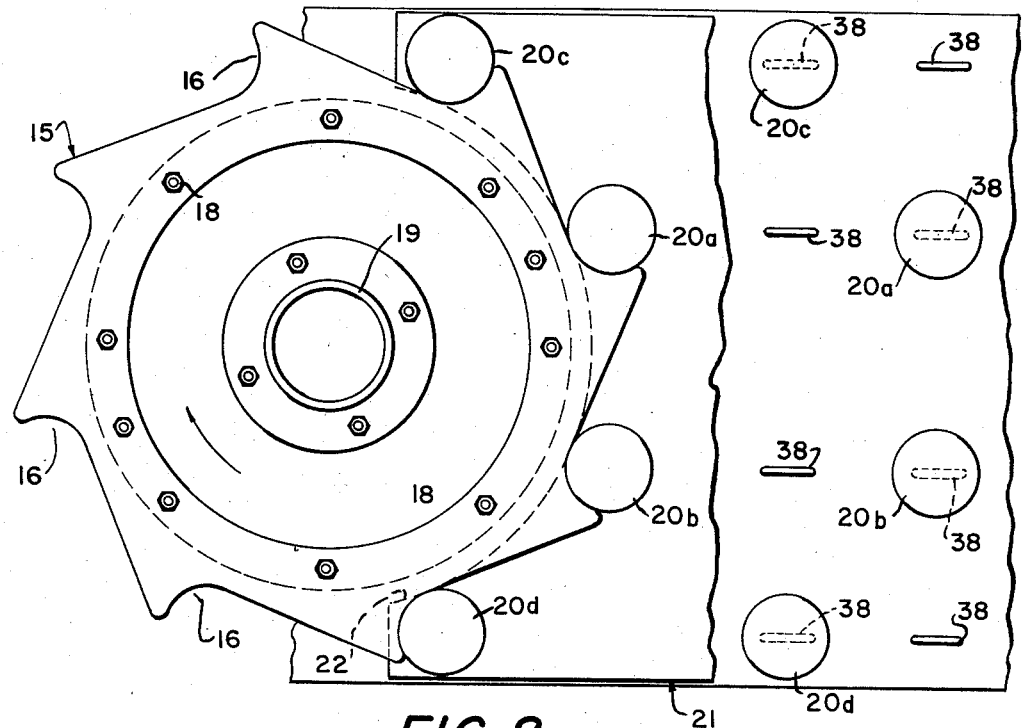
Fig. 8 is a top plan view of the star wheel which is part of the loading mechanism, with a part of the slide plate shown in outline to illustrate the location of the plate beneath the star wheel in can receiving position, and also showing part of the washing machine conveyor which receives cans from the slide plate.
Figure 9:
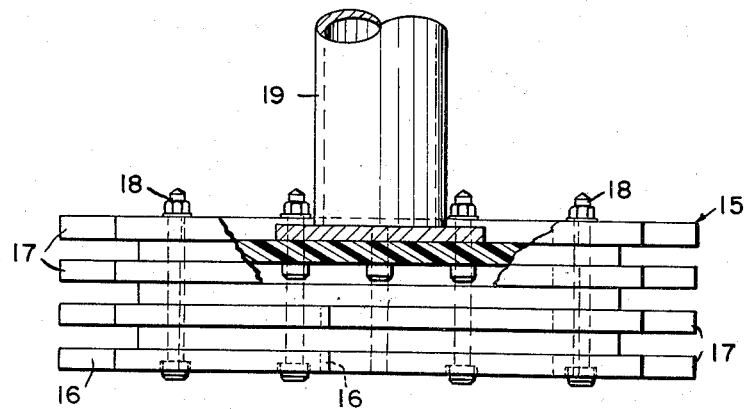
Fig. 9 is an elevational view of the star wheel.

Since the star wheels 15 are alike, only one need be described. I have chosen to construct the wheel to provide peripheral can engaging surfaces, in this embodiment eight pockets 16, transversely curved and vertically straight, complemental in shape to a side of the cans to be engaged thereby, as best shown in Fig. 8. The wheel 15 may be made up of vertically spaced plates indicated at 17 in Fig. 9, bolted together by bolts 18, and mounted on and keyed to a vertical shaft 19 to rotate therewith. A wheel of larger diameter, provided with more pockets 16, may be used to accommodate a larger number of cans, but for the purposes of my loading mechanism, an even number of pockets is required because the mechanism is designed to deposit a batch of cans one-half in number of the total number of pockets 16.

Cans 20 from the chute 14 move one by one into position adjacent the rotating star wheel 15 and are engaged by pockets 16. When the wheel 15 has made one-half revolution, half of the cans, in this case four cans 20 will be positioned on a slide plate 21, and then the rotation of the star wheel is interrupted.

Figure 5:
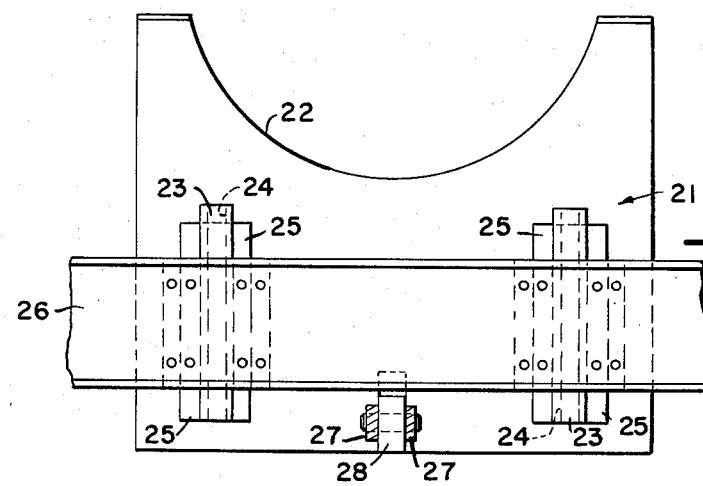
Fig. 5 is a top plan view of the slide plate and track assembly which are part of the loading mechanism.
Figure 6:
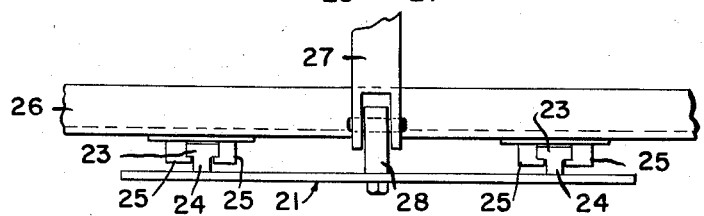
Fig. 6 is a rear elevation of the parts shown in Fig. 5, with part of the rocker arm broken away.
Figure 7:
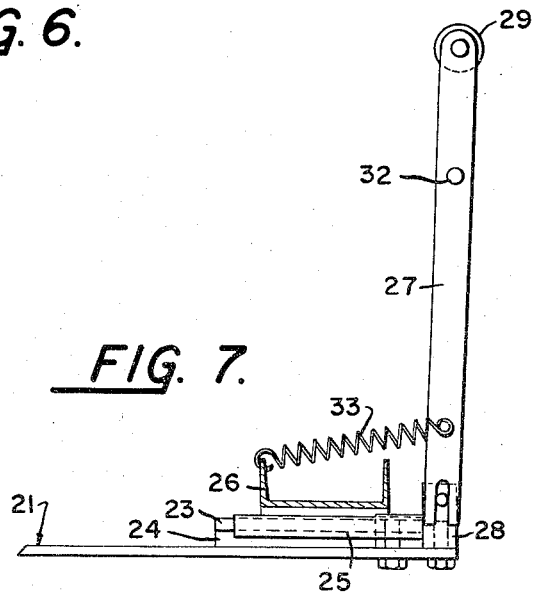
Fig. 7 is a side elevation of the slide plate and track assembly shown in Fig. 5.

The slide plate 21 is shown in Figs. 3 and 4, and together with its track assembly, is shown in detail in Figs. 5, 6 and 7. The plate 21 is flat, horizontally disposed, straight edged on its two sides and rear, and semi-circular as indicated at 22 on its forward edge. The edge 22 is concentric with the axis of the star wheel 15 and the area adjacent said edge is designed to underlie half of the wheel 15 adjacent its periphery, including the area occupied by four of the pockets 16 at one side of the wheel. Thus the plate 21 supports the cans engaged by half of the pockets 16 of the wheel, the plate being stationary while the wheel makes half of a turn to move the four cans into proper location on the slide plate for depositing on a conveyor, as will be explained.

The slide plate 21 is provided on its upper surface with a pair of rails 23 on spacers 24, the rails being slidably mounted in tracks 25 fixed on the bottom of a horizontal frame member 26 connected at opposite ends to the side walls 10 and 11 of the washing machine. Movement of the plate is produced by a rocker arm 27 pivotally connected at its lower end to a block 28 fixed on the plate 21 adjacent its rear edge. The upper end of the rocker arm 27 is provided with a cam follower 29 engaged by a cam 30 mounted on a cam shaft 31 extending horizontally and transversely between the machine walls 10, 11. The arm rocks about its pivotal connection 32 to a shaft or other support located beneath the cam shaft 31.

In Fig. 4, the slide plate 21 and rocker arm 27 are shown in full and dotted lines to indicate the two positions they assume when reciprocated, the cam 30 moving the upper end of the arm forwardly (to the left in Fig. 4) whereby the lower end of the rocker arm and the plate 21 are retracted or moved rearwardly, the return movement being effected by the spring 33 connected at one end to the rocker arm 27 and at the other end to the fixed frame member 26 or other support. When the plate 21 is in the dotted line position shown in Fig. 4, it has been withdrawn from the star wheel and consequently any cans 20 supported on that part of the plate 21 which underlies the peripheral portion of the wheel will drop to the conveyor 35 about to be described.

The can receiving conveyor indicated as a whole at 35 is endless, supported on the conveyor sprockets 36 mounted on the rotated shaft 37. The carrying surface of the conveyor 35 is provided with can engaging devices in the form of wire loops or fingers 38 arranged in rows, the loops being spaced longitudinally and the rows of loops being spaced transversely of the conveyor. They register vertically and axially with four adjacent pockets 16 of the star wheel 15. The arrangement is such that when four cans drop to the conveyor 35 from the retracted slide plate 21, out of the pockets 16 of the star wheel, the two center cans of the batch are entered by two adjacent loops in one transverse row on the conveyor and the two ends cans of the batch are entered by two non-adjacent loops in a transverse row next to the row in which the two center cans are located. This will be understood by reference to Fig. 8, where two adjacent center cans 20a and 20b of a batch of four are in register with fingers 38 of one transverse row of fingers, and the end cans 20c and 20d are in register with fingers 38 of a transverse row adjacent the first mentioned row.

After the cans of a batch have been deposited on the conveyor, the star wheel 15 is rotated another half revolution to move another batch of cans into the loading position above the underlying slide plate 21. When the plate is retracted, the second batch of cans will be dropped, and the two adjacent center cans of the batch will fall into place onto conveyor fingers between the cans 20c and 20d, while the two opposite end cans of that second batch will drop to their positions in the next transverse row, but in the longitudinal rows occupied by cans 20c and 20d. Thus the conveyor beneath one star wheel requires loops in four longitudinal rows of loops 38 to enter the open lower ends of the dropped cans and engage them in such manner as to hold them in inverted substantially vertical positions on the conveyor for the washing operation.

Figure 2:
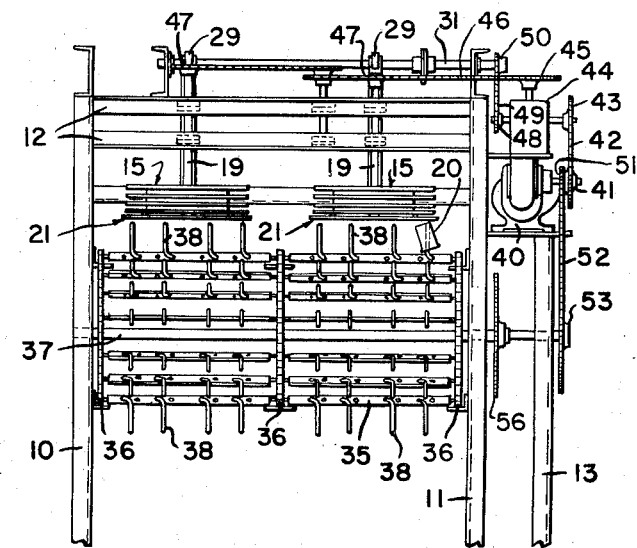
Fig. 2 is a front elevation and Fig. 3 is a top plan view of the same.

Driving mechanism for continuously moving the conveyor 35, for intermittently rotating the star wheel 15, and for rotating the cam shaft 31 to reciprocate the slide plate 21 is best shown in Figs. 1, 2 and 3. A motor 40 rotates a sprocket wheel 41 on which is trained a sprocket chain 42 which engages the sprocket 43 on the side of a speed change unit 44. Mounted on a vertical shaft driven by the speed change unit 44 is a sprocket gear 45 connected by sprocket chain 46 to gears 47 mounted on the vertical star wheel shafts 19 for intermittently rotating said shafts 19 one-half of a revolution.

On a shaft extending from the inner side of the unit 44 is a smaller sprocket gear 48, connected by sprocket chain 49 to gear 50 on cam shaft 31, whereby rotary motion is transmitted to the cam shaft 31 and cams 30 for retracting the slide plates 21.

The same motor shaft which drives the sprocket 41 also rotates a smaller gear 51 connected by sprocket chain 52 to a large sprocket wheel 53 on which is concentrically fixed the small gear 54 connected by chain 55 to the sprocket 56 fixed on the conveyor shaft 37, whereby the conveyor 35 is continuously moved through the washing machine.

The drive mechanism is geared and timed by means known in the art so that the star wheel rotates half of a revolution to carry a batch of cans into position above the forward curved edge area of the stationary slide plate 21; then the rotation of the star wheel is interrupted while the working face of the cam 30 actuates the rocker arm 27 to retract the plate 21. When the working face of the cam 30 has disengaged the rocker arm 27, the spring 33 pulls the rocker arm and plate 21 forwardly and returns it to can supporting position. Then rotation of the star wheel shaft 19 is resumed for another half turn, repeating the described cycle. Meanwhile, the conveyor shaft 37 is being continuously rotated to move the conveyor 35 through the washing machine at such speed that the loops 38 are in position to receive the cans which are dropped after each half rotation of the star wheels.

As previously explained, one or more star wheels may be employed, and the size and form of the wheels may be varied to accommodate any desired number of cans, one-half of the cans handled by each wheel constituting a batch to be dropped onto the washing machine conveyor when the sliding plate associated with the wheel is withdrawn from its can supporting position beneath the wheel.

From the foregoing description and the drawings it will be apparent that the loading mechanism comprising the star wheel or star wheels 15 and the slide plate or plates 21 is completely contained within the chamber defined by the walls 10, 11, of the washing machine, and that the loading mechanism deposits batches of cans on the receiving conveyor in transversely extending curved rows or areas fully as wide as the entire width of the loading mechanism.

The invention is adapted for embodiment in machines other than can washing machines, in any can or article handling machine where it is desirable to load a conveyor with a plurality of rows of articles from a production line of such articles.

In describing the invention, reference has been made to a particular example embodying the same, but I wish it to be understood that the invention is not limited to the construction shown in the drawing and that various changes may be made in the construction and general arrangement of parts without departing from the invention.

I claim:

1. In a can handling machine comprising spaced apart side walls defining a chamber and a can receiving conveyor in the chamber, loading mechanism located within the chamber comprising a wheel rotatable about a vertical axis above the receiving conveyor, can engaging pockets on the peripheral surface of the wheel and a slide plate having an edge concentric with the axis of the wheel and a can supporting area adjacent said edge underlying part of the can engaging pockets, means intermittently rotating the wheel part of a revolution and means intermittently retracting the slide plate and permitting a batch of cans to drop to the receiving conveyor from the plate in a part-circular path having a diameter substantially equal to the width of the loading mechanism.

2. In a can handling machine comprising spaced apart side walls defining a chamber and a can receiving conveyor in the chamber, loading mechanism located within the chamber comprising a wheel rotatable about a vertical axis above the receiving conveyor, can engaging pockets on the peripheral surface of the wheel and a slide plate having an edge concentric with the axis of the wheel and a can supporting area adjacent said edge underlying half of the can engaging pockets, means intermittently rotating the wheel a half revolution and means intermittently retracting the slide plate and permitting a batch of cans to drop to the receiving conveyor from the plate in a semi-circular path having a diameter substantially equal to the width of the loading mechanism.

3. The machine defined by claim 1, in which the means intermittently retracting the slide plate comprises a rocker arm pivotally connected at its lower end to the slide plate, a horizontal support above the plate to which the rocker arm is pivotally connected between its ends, a rotated cam engaging the upper end of the rocker arm and intermittently moving it in one direction and thereby moving the plate in the opposite direction away from the wheel.

4. In a can handling machine comprising spaced apart side walls defining a chamber and a can receiving conveyor in the chamber, loading mechanism located within the chamber comprising a wheel rotatable about a vertical axis above the receiving conveyor, can engaging pockets on the peripheral surface of the wheel and a slide plate having an edge concentric with the axis of the wheel and a can supporting area adjacent said edge underlying part of the can engaging pockets, a fixed support extending across the machine above the slide plate, a pair of tracks depending from the support in a direction longitudinally of the machine, a rail on top of the slide plate movable in said tracks, means intermittently rotating the wheel part of a revolution and means intermittently retracting the slide plate and permitting a batch of cans to drop to the receiving conveyor from the plate in a part-circular path having a diameter substantially equal to the width of the loading mechanism.

5. Mechanism for batch loading a multi-row conveyor with cans, comprising a chute carrying a row of cans, a wheel having a vertical axis and a plurality of can engaging pockets on its peripheral surface, said pockets traversing an open end of the chute when the wheel is rotated, means intermittently rotating the wheel one-half of a revolution, a horizontal slidable plate having an edge concentric with the axis of the wheel and a can supporting area adjacent said edge underlying the wheel, means reciprocating the slidable plate when the wheel is idle from and to can supporting position beneath the wheel, an endless conveyor located beneath the plate and wheel, a plurality of longitudinally extending rows of can entering devices rising from the carrying surface of the conveyor, the rows registering with adjacent pockets of the wheel equal to half of the total number of pockets on the wheel, and means continuously moving the conveyor.

6. A can washing machine comprising an elongated housing having side walls and open ends, a conveyor drive shaft extending transversely between said side walls, a plurality of sprocket wheels fixed on the shaft, transversely spaced conveyor means on the sprocket wheels extending longitudinally of the housing, longitudinally extending rows of can engaging devices rising from the conveyor means, a wheel having a plurality of equally spaced can engaging pockets formed on its peripheral surface, a vertical shaft on which the wheel is fixed, a gear on the upper free end of the shaft, a can supply chute having an open end adjacent the pocketed surface of the wheel, a horizontal slide plate having a can supporting area located beneath the wheel, a rocker arm pivotally connected to the plate and extending upwardly, a fixed support to which the rocker arm is pivotally connected between its ends, a cam shaft extending transversely of the housing, a cam fixed on the shaft, the cam having a working face intermittently engaging the upper free end of the rocker arm and thereby moving the plate in one direction, means returning the plate, a motor supported adjacent the housing, operative connections between the motor and conveyor drive shaft continuously rotating said shaft, operative connections between the motor and the gear on the vertical wheel shaft intermittently rotating the wheel shaft, and operative connections between the motor and cam shaft continuously rotating the cam shaft.

7. The machine defined by claim 6, in which the number of longitudinally extending rows of can engaging devices are not less than one-half the number of pockets on the peripheral surface of the wheel.

8. The machine defined by claim 6, in which the slide plate is provided with an edge concentric with the axis of the wheel and the can supporting area of the plate is adjacent said edge.

References Cited in the file of this patent

UNITED STATES PATENTS

| | | |
|---|---|---|
| 2,452,376 | Holstebroe | Oct. 26, 1948 |
| 2,675,184 | Abbott | Apr. 13, 1954 |
| 2,794,532 | Snow | June 4, 1957 |